(12) United States Patent
Cronin (10) Patent No.: US 12,481,929 B2
(45) Date of Patent: Nov. 25, 2025

(54) CHEMICAL COMPUTER

(71) Applicant: THE UNIVERSITY COURT OF THE UNIVERSITY OF GLASGOW, Strathclyde (GB)

(72) Inventor: Leroy Cronin, Glasgow Strathclyde (GB)

(73) Assignee: THE UNIVERSITY COURT OF THE UNIVERSITY OF GLASGOW, Glasgow Strathclyde (GB)

( * ) Notice: Subject to any disclaimer, the term of this patent is extended or adjusted under 35 U.S.C. 154(b) by 1148 days.

(21) Appl. No.: 17/277,514

(22) PCT Filed: Sep. 20, 2019

(86) PCT No.: PCT/EP2019/075423
§ 371 (c)(1),
(2) Date: Mar. 18, 2021

(87) PCT Pub. No.: WO2020/058516
PCT Pub. Date: Mar. 26, 2020

(65) Prior Publication Data
US 2022/0036252 A1    Feb. 3, 2022

(30) Foreign Application Priority Data
Sep. 21, 2018 (GB) .................................... 1815424

(51) Int. Cl.
*G01N 31/00* (2006.01)
*G06N 99/00* (2019.01)
*G16C 20/10* (2019.01)

(52) U.S. Cl.
CPC ........... *G06N 99/007* (2013.01); *G16C 20/10* (2019.02)

(58) Field of Classification Search
None
See application file for complete search history.

(56) References Cited

U.S. PATENT DOCUMENTS

2010/0159590 A1* 6/2010 Alley ..................... C12M 23/40
435/305.2

OTHER PUBLICATIONS

Merriam-Webster Dictionary, defintion "matrix" (2024) [retrieved on Sep. 28, 2024] Retrieved from the Internet: <https://www.merriam-webster.com/dictionary/matrix>.*
International Search Report and Written Opinion mailed Jan. 8, 2020 for corresponding International Application No. PCT/EP2019/075423.
Henson, Alon et al. "Towards heterotic computing with droplets in a fully automated droplet-maker platform." Philosophical transactions. Series A, Mathematical, physical, and engineering sciences vol. 373,2046 (2015): 20140221. doi:10.1098/rsta.2014.0221.
GB Search Report dated Mar. 27, 2019 for corresponding GB Application No. 1815424.5.
Lebender, et al. "Logical Gates Using a Nonlinear Chemical Reaction", Journal of Physical Chemistry, vol. 98, No. 31 (1994), pp. 7533-7537.
Adamatzky, Andrew et al. "On computing in fine-grained compartmentalised Belousov-Zhabotinsky medium" Chaos, Solitons & Fractals, 44 (2011), pp. 779-790. doi:10.1016/j.chaos.2011.03.010.
Schinor, et al. "The phases of small networks of chemical reactors and neurons." Biophysical Chemistry, vol. 85 (2000), pp. 199-208. doi:10.1016/s0301-4622(99)00155-6.
Szymanski, et al. "Droplets with information processing ability" University of Jena (2010), 20 pages https://www.chemicalneuronalnet.uni-jena.de/neuneu_media/de/pdfs/D2_2_IJUC_0093_GORECKI.pdf (last accessed Mar. 17, 2021).
Crowley, Michael F. et al. "Experimental and Theoretical Studies of a Coupled Chemical Oscillator: Phase Death, Multistability, and In-Phase and Out-of-Phase Entrainment", Journal of Physical Chemistry (1989) vol. 93, pp. 2496-2502.
Deco, Gustavo, et al. "Hierarchy of Information Processing in the Brain: A Novel 'Intrinsic Ignition' Framework." Neuron, vol. 94,5 (2017), pp. 961-968 doi:10.1016/j.neuron.2017.03.028.
Hsu, T.J., et al. "Effects of Macromixing on the Oregonator Model of the Belousov-Zhabotinsky Reaction in a Stirred Reactor", Chemical Engineering Science (1994), vol. 49, No. 24B, pp. 5291-5305.
Schrauwen, Benjamin et al. "An Overview of Reservoir Computing: Theory, Application and Implementations", The 15th European Symposium on Artificial Neural Networks (2007), pp. 471-482.
Toffoli, Tommaso "Nothing Makes Sense in Computing Except in the Light of Evolution", International Journal of Unconventional Computing (2005), vol. 1, pp. 1-29.
Watts, Duncan et al. "Collective Dynamics of 'Small-World' Networks", Nature vol. 393, (1998), pp. 440-442.
Yildiz, Izzet B. et al. "Re-Visiting the Echo State Property" Neural networks vol. 35 (2012), pp. 1-25.
Zhu, Shi-Liang and Wang, Z.D. "Unconventional Geometric Quantum Computation" Physical Review Letters, vol. 91 No. 18, w/e Oct. 31, 2003, 4 pages.

* cited by examiner

*Primary Examiner* — Anna Skibinsky
(74) *Attorney, Agent, or Firm* — Tarolli, Sundheim, Covell & Tummino LLP (57) ABSTRACT

The invention provides a chemical computer having a matrix, an input device and an analytical device. The matrix is a plurality of interconnected reaction spaces holding a reaction mixture; the input device is provided to independently address each of a plurality of reaction spaces within the matrix; and the analytical device has a sensor to analyse a reaction characteristic of a reaction mixture in one or more reaction spaces. Also provides are methods for using the chemical computer, and the use of the chemical computer as a logic gate.

12 Claims, 5 Drawing Sheets

CHEMICAL COMPUTER

RELATED APPLICATIONS

The present application is a U.S. National Stage application under 35 USC 371 of PCT Application Serial No. PCT/EP2019/075423, filed on 20 Sep. 2019; which claims priority from GB Patent Application No. 1815424.5, filed 21 Sep. 2018, the entirety of both of which are incorporated herein by reference.

FIELD OF THE INVENTION

The present invention provides a programmable chemical computer for use as a logic gate and as a data store, as well as methods for operating logic gates and methods for storing and retrieving data using the chemical computer.

BACKGROUND

Over the last 50 years computers have become ubiquitous, essential for many aspects of modern life. During this period their processing power has increased manifold, but the paradigm used has remained the same keeping the processor and memory separate (Toffoli), and using binary state electronic switches. Systems based upon quantum effects promise to solve problems intractable for conventional computers (Zhu et al.), but they are yet to reach their full potential. However, nature exploits the parallelism of collective networks by developing systems able to process information despite large amounts of noise (Watts et al.; Deco et al.).

There is a desire for alternative systems of computing using alternative strategies to process store and retrieve information that are low power, increase the number of computational states, and allow non-silicon-based substrate for computation.

SUMMARY OF THE INVENTION

The present inventor has established that chemical reactions may be exploited for use in information processing, and more particularly, chemical reactivity may be reliably and repeatedly used within logic operation and data storage.

In a general aspect the present invention provides a chemical computer, which utilizes individually addressable and addressed, but fully interconnected, reaction spaces within a matrix. The matrix holds a reaction mixture which is capable of real time operation.

Addressing the reaction mixture held in one reaction space may give rise to the propagation of a reaction that extends into neighbouring reaction spaces. Consequential changes in the reaction mixture within those neighbouring spaces give rise to a detectable reaction characteristic.

The steps of addressing reaction spaces within the matrix, and the analysis of reaction spaces for changes in reaction characteristics, allow the chemical computer to be used as a logic gate and also as a data storage and a data retrieval device.

In a first aspect of the invention there is provided a chemical computer comprising a matrix, an input device and an analytical device, wherein:
the matrix comprises a plurality of interconnected reaction spaces holding a reaction mixture;
the input device is provided to independently address each of a plurality of reaction spaces within the matrix; and
the analytical device has a sensor to analyse a reaction characteristic of a reaction mixture in one or more reaction spaces.

The reaction mixture may be a reaction mixture for a chemical oscillator reaction.

The chemical oscillator reaction may be selected from the group consisting of a Belousov-Zhabotinsky (BZ) reaction, a Briggs-Rauscher reaction and a Bray-Liebhafsky reaction, such as a Belousov-Zhabotinsky (BZ) reaction.

The reaction mixture may be a reaction mixture having a colour change in its reaction, and here the analytical device has an optical sensor to analyse the colour change in one or more reaction spaces. An oscillation reaction may therefore be oscillations between species of different colour.

The input device is for independently providing an input to each of a plurality of reaction spaces within the matrix. The input may be selected from the group consisting of a mechanical force, an optical input, an electrical input, a sonic input, a magnetic input and a thermal input. Typically, the input device is for independently providing a mechanical force to each of a plurality of reaction spaces within the matrix.

The invention also provides a logic gate which comprises the chemical computer of the invention.

Furthermore, the invention also provides the use of a chemical computer as a logic gate.

The present invention also provides a method for the operation of a chemical computer, for example for use as a logic gate or for use in data storage and retrieval, the method comprising the steps of:
(i) providing the chemical computer of the invention;
(ii) addressing a first and/or a second reaction space in the matrix using the input device;
(iii) analysing a reaction characteristic of a third reaction space using the analytical device;
(iv) determining a logic result based on the addressing step and the analysis step.

SUMMARY OF THE FIGURES

FIG. 1 is a schematic of a chemical computer system according to an embodiment of the present invention, showing an illustration of (top left) a digital domain represented by a matrix comprising a plurality of discrete reaction spaces in a grid, which reaction spaces are addressed by mechanical stirring of the reaction mixture, with the option of variable speed; (top centre) a chemical domain, where the observed chemical reactivity in a reference matrix without discrete reaction spaces is shown (top) compared with the observed chemical reactivity in a matrix with discrete reaction spaces (bottom); (c) an analytical read out taken for a matrix where a selection of reaction spaces is addressed, showing the raw recorded data (left), and the digitisation of the results based on a colour analysis of the reaction outcome, using, for example, machine learning processes (right); (bottom left) the change in the number of possible computational states with the changes in the matrix size, as given by the total number of reaction spaces; (bottom middle) evolving microsites within a matrix, showing that neighbouring reactions space may be regarded as weakly connected, oscillations will convolve, and be able to solve complex computations; (bottom right) a chemical recurrent state, showing that the BZ oscillations have memory, therefore the global state of the reaction medium not only depends on the input, but also on the state of previous iterations.

FIG. 3 is a series of schematics of matrixes in a chemical computer according to an embodiment of the invention for use as logic gates showing the use (A) an AND gate; (B) and OR gate; and (C) an XOR gate, showing the truth tables for each operation. Each gate uses a matrix having a 5×5 arrangements of reaction spaces. A first series of reaction spaces at the left side (X) are addressable and a second series of reaction spaces (Y) spaced from the left side is addressable. The reaction mixtures within each reaction space are addressed by mechanical perturbation of the reaction space using a stirrer bar. Shown in (A) and (B) are the recorded images where the first and/or second series of reactions spaces is addressed. The distance between the series is used to emulate the logic operation, owing to limited propagation of the excitation wave from an addressed series of reaction spaces. If X and Y are separated by 4 reaction spaces, then the matrix behaves like an AND gate, whereas if they are separated by 2 reaction spaces, then it behaves like an OR gate. Shown in (C) are the recorded images where the logical operation is based on a phase difference between localized oscillations. The leftmost and rightmost five cells are considered as inputs (X, Y). The heat maps show the phase differences between the central cell (position 3,3) and other cells. E ach input pattern shows a distinctive BZ excitation wave pattern.

FIG. 5 is a series of schematics comparing the use of a chemical computer system with an autoencoder in a pattern recognition process, showing (top-left) a flow diagram of the pattern recognition process. The bottom path uses an Autoencoder which has been trained beforehand in order to digitally produce BZ oscillations from motor patterns. The top path uses the BZ medium as described on FIG. 4. In this case, the labelling is performed by a Convolutional Neural Network (CNN) once the BZ oscillations are generated; (top-right) a diagram of the CNN used. It contained three convolutional layers with filters of 3×3, 5×5 and 3×3. In the bottom row there it can be seen how we speculate that the CNN learns how to classify a given input by finding the points of the oscillations where it contains a bigger phase difference; and (bottom) digitally generated BZ oscillations using the Autoencoder. For each case, the input shown is the motor pattern used, and the output shown is the BZ oscillation obtained. In these BZ oscillation plots the blue colour represents when the oscillation happens. The X axis means time, and the Y axis means location—for each of the 25 reaction spaces. The coding represents the hidden layer of the Autoencoder.

DETAILED DESCRIPTION OF THE INVENTION

The present invention provides a digitally programmable chemical computer, which comprises a matrix having independently addressable and interconnected reaction spaces. The reaction spaces hold a reaction mixture, such as a reaction mixture for a chemical oscillating reaction, and this mixture is used as a data processing medium. The reaction mixture can be programmed to achieve flexible and multipurpose computation, by exploiting changes in the reactivity across the matrix in response to input signals delivered to certain reaction spaces within the matrix.

Addressing reaction mixtures held within the reaction spaces may generate spatiotemporal excitation patterns that extend across the matrix. In the preferred embodiments of the invention, a chemical oscillation reaction is used, and the inputs into the matrix can be used to control the oscillation at the addresses sites. Excited reaction waves generated in a reaction space propagate to neighbouring cells and may eventually form a globally synchronized oscillation pattern. As a result, the platform is like the coupled-oscillator model (Crowley et al.). This type of reactivity provides for the use of the matrix within a programmable chemical computing system, exploiting the analogue dynamics of the chemical system.

The chemical computer is capable of performing different computational tasks such as memory, logic operations and chemical autoencoding, for example with pattern recognition.

The exemplification of the chemical computer in the present case uses a reaction mixture for a chemical oscillating reaction, and specifically a Belousov-Zhabotinsky (BZ) reaction. The computer architecture is based on data storage information processing via electron transfer between molecules of $[Fe(Bpy)_3]^{2/3+}$, and this depends on interactions between states where the oxidized regions containing Fe(III) are blue, and the reduced states containing Fe(II) species are red. To achieve this, a platform was designed that controls the oscillations of the BZ reaction at local reactions spaces, or sites, in a matrix by externally manipulating the rotation speed of magnetic stirrers in the cells (a mechanical manipulation of the cell contents), and using a camera above the matrix to monitor the oscillation states of the reaction in the cells.

Szymanski et al. have studied a Belousov-Zhabotinsky (BZ) reaction within aqueous droplets that are dispersed in an organic continuous phase. In particular, the authors have considered the transmission of reactivity waves between neighbouring droplets, and they have looked at the influence of droplet size on the transmission direction.

The work of Szymanski et al. does not make use of a matrix to hold each reaction, and it does not describe the use of any device to independently address each separate reaction. Seemingly Szymanski et al. generate droplets by simply dispersing the aqueous reaction phase in the organic phase. In Szymanski et al. the droplets are allowed to form, and differences in reactivity between droplets result from differences in droplet size. The individual droplets used by Szymanski et al. are not individually addressable in any way.

There is no suggestion by Szymanski et al. that their droplet system could be used as a logic gate or for data storage. Although Szymanski et al. say that their work is useful for information processing there is no detailed description or example where the droplet system can be used in this way.

Schinor et al. also consider a Belousov-Zhabotinsky (BZ) oscillation reaction, and how one reaction of this type might influence one or two other reactions to which it is linked. The reaction set up in Schinor et al. uses two or three reaction vessels for each oscillation reaction, with each reaction vessel provided with a stirrer bar and an electrochemical analytical device. The electrochemical signals recorded from one reaction vessel are transmitted to other reaction vessels and the coupling of the oscillatory reactions in this way is analysed.

In the present case, a reaction within one reaction space is able to propagate a reaction wave from that space into a neighbouring reaction space. Thus, there is a fluid connection between the reaction spaces, and this is not present in the system described by Schinor et al., which relies purely on electrical connections.

Adamatzky et al. discuss the use of the Belousov-Zhabotinsky (BZ) oscillation in logic operations. The work by Adamatzky et al. is entirely computational, and there is no in vitro experimental support for the in silico operation of the oscillation reactors described. In particular Adamatzky et al. do not explain how a reaction space can be addressed in practice, and nor do they discuss the analysis of reaction outcomes across a matrix.

Lebender et al. is earlier work from the same group as the Schinor et al. Lebender et al. describe the use of chemical reactivity to generate a logic gate capable of AND, OR and NAND operations.

The apparatus for use consists of a series of interlinked reaction vessels. Within the series there are two input reaction vessels for use in providing binary chemical signals: here two different reaction states in a simplified version of the Belousov-Zhabotinsky (BZ) oscillation reaction. The reaction vessels are not in any way part of a matrix, and they are used as separate reaction vessels.

Lebender et al. clearly explain that the interlinking between reaction vessels to form the logic gate is not a chemical interlinking, and the logic operations are realised by computer operation. The authors explain that a true chemical computer can only be achieved where the reaction outcomes in the two input reaction vessels is fed to an output reaction, which is not the case in their work.

Figure 3:
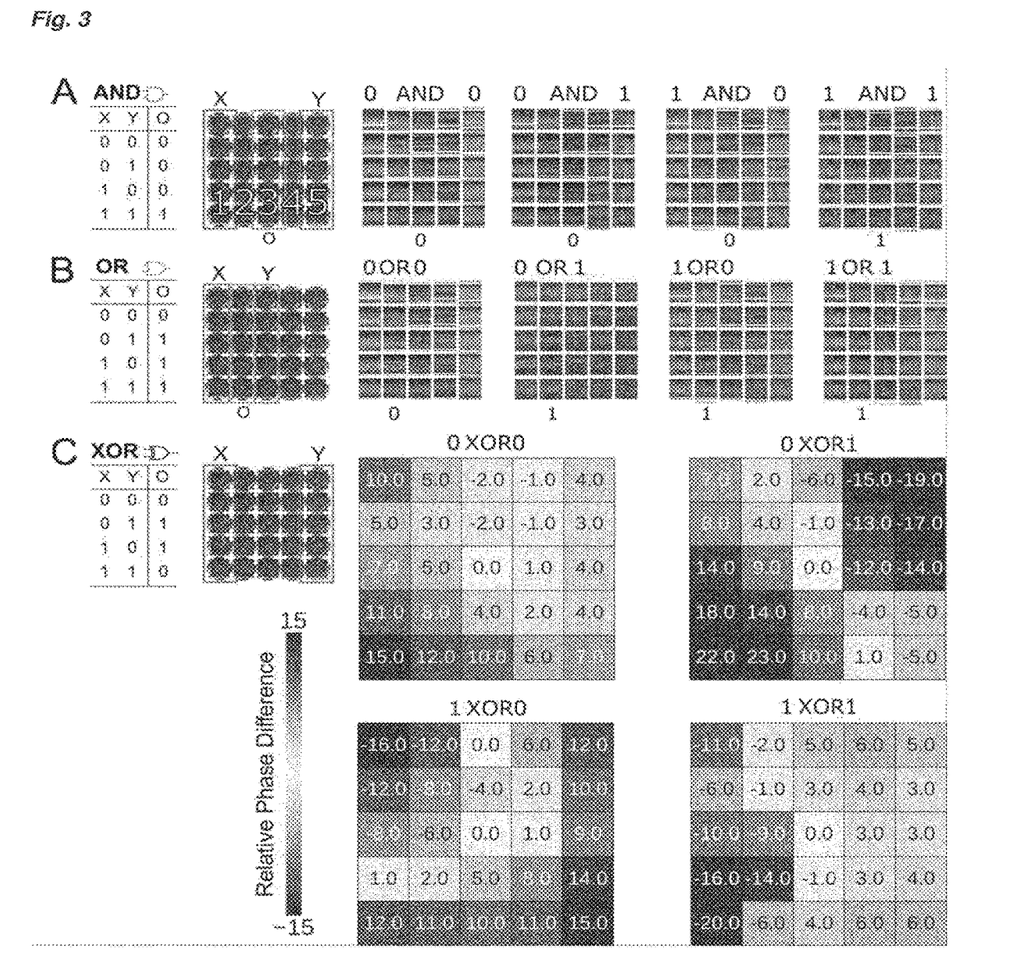

The present invention provides a chemical computer. Here is shown that reaction waves initiated within input reaction spaces of a matrix are can be propagated into neighbouring reaction spaces with constructive and destructive interference giving a certain reaction result in those neighbouring spaces. This result can be read by an analytical device, and it gives the output for the logic operation (for example, as shown in FIG. 3 of the present case).

Chemical Computer

The chemical computer of the invention comprises a matrix, as described herein, which is provided in combination with an input device and an analytical device. Each of these components is described in further detail below, together with their interoperation in logic processes and methods for storing and retrieving data. The computer is programmable, as it is capable of accepting information, and is capable of storing that information in the form of a modified chemical reactivity.

The chemical computer may further comprise a control unit for controlling the input device, for controlling the analytical device and for interpreting the analytical data recorded by the analytical device.

The present invention also provides a plurality of chemical computers, where the chemical computers are provided in series or in parallel.

Matrix

The matrix is an array of interlinked reaction spaces. Each reaction space may be referred to as an element or an entry within the matrix.

At its simplest, the matrix may be a sequence, such as a linear sequence, of elements. Thus the matrix may be regarded as substantially one dimensional. However, it is preferable that the elements are arranged in a grid. Thus the matrix may be regarded as two dimensional. In other embodiments, the elements may extend across three-dimensions.

The grid design may be adapted for the type of computation activity under consideration. For example, in the operation of the matrix for a logic gate, the spacing between reaction spaces is important for the propagation of reactivity through the matrix.

The matrix contains a reaction mixture, which mixture is distributed between reaction spaces of the matrix. The reaction mixture may be a continuous reaction mixture throughout the matrix. Thus, the reaction spaces in the matrix do not substantially isolate portions of the reaction mixture. In practice, the matrix is provided with passages (or gates) between reaction spaces to allow for the continuous distribution of the reaction mixture through the array.

The reaction mixture may also be a series of contacting reaction mixtures, such as contacting droplets.

Chemical reactivity initiated in one reaction space may extend as a reaction front (or wave) into neighbouring reaction spaces within the matrix. The reaction front may also be referred to as an excitation wave.

The dimensions and shape of each reaction space are not particularly limited. In practice the volume of each reaction space is minimised, where possible, to minimise the size of the matrix itself, and therefore to minimise the overall size of the chemical computer.

The shape of a reaction space is also chosen to allow for suitable packing of neighbouring reaction spaces around it, and therefore to allow for reactive communication between neighbouring reaction spaces.

The effective memory, and the durability of the memory, can be controlled by the amount of active reagents and the excitation route. In simple terms, the larger the volume of chemistry, the longer the memories can be stored.

The programmability of the chemical computer is linked to the unique number of reaction spaces in the matrix, which therefore also dictates the number of inputs that be made into the matrix. In addition to this, programmability is generated from the number of different chemical states that are accessible in response to the inputs, and the combinations of inputs.

A reaction space is in reactive communication with its neighbours within the matrix. Thus, a reaction established in one reaction space is permitted to propagate from that reaction space into neighbouring reaction spaces.

The reactive communication may be a fluid communication—typically liquid communication—between neighbours. Thus, individual reaction spaces may be connected via fluid passages. On a practical level, the reaction spaces are provided by reaction chambers, whose walls are share with other reaction chambers. Walls between neighbouring reaction chambers, therefore neighbouring reaction spaces, may have openings to permit fluid communication between neighbours.

The fluid passages between neighbouring reaction spaces is sufficient to allow a reaction wave to be transmitted from one reaction space to its neighbour.

One or more, and most preferably two or more, of the reaction spaces is addressable by an externally applied force. The applied force is an input for the system that is used to establish a reaction wave within the reaction space, which reaction wave is permitted to propagate into neighbouring reaction spaces.

Preferably each of the reaction spaces is individually and independently addressable.

The matrix is adapted for use with an input device, for applying a force into the reaction spaces.

The matrix is also adapted for use with an analytical device, for analysing the contents of each of the reaction spaces.

The matrix may be a unitary piece, for example as might be formed by injection moulding or 3D printing.

Input Device

The chemical computer is provided with an input device for applying a force to one or more reaction spaces within the matrix. The matrix may therefore be regarded as addressable by the input device. Essentially the input device is capable of independently perturbing each reaction space in the matrix.

The input device is suitable for providing an input selected from the group consisting of a mechanical force, an optical input, an electrical input, a sonic input, a magnetic input and a thermal input. Typically, the input device is for independently providing a mechanical force to each of a plurality of reaction spaces within the matrix.

The input device may be capable of binary operation. Here, the input device may provide a force, or provide no force at all. The input device may also be capable of providing degrees of force between a maximum force and a minimum force, or no force.

The input device is suitable for providing an input continuously, or for periods of time as necessary, and also intermittently as desired.

In the worked examples of the present case, a reaction mixture in a space is addressed by mechanical force. Thus, a magnetic stirrer bar is provided within each reaction space to provide mechanical agitation of the reaction mixture. The stirrer bar is a component of the input device, which device is also provided with a plurality of magnetic stirrers to independently operate each stirrer bar.

The magnetic stirrers are also used to demonstrate the use of the input device to provide degrees of force to a reaction mixture within a reaction space. As well as being capable of binary operation (on or off), the stirrer speed may be altered to provide degrees of force, and the worked examples shows how the changes that occur across a matrix in response to different magnitudes of force can be exploited, for example in an XOR logic gate.

Analytical Device

The chemical computer is provided with an analytical device for analysing the reaction spaces of the matrix.

The analytical device is provided with one or more sensors which are located about the matrix to permit the sensor to analyse the contents of one or more reaction spaces. A sensor may be provided for each reaction space, or alternatively a single sensor may be permitted to analyse a plurality of reaction spaces, such as all of the reaction spaces within the array.

The sensor is selected based on the reaction for performance, and particularly the changes in the reaction mixture during a reaction.

The analytical device may comprise an optical sensor, an electrochemical sensor, an acoustic, or combinations thereof. Typically the sensor should be capable of 2D or 3D spatial mapping, and the time resolution for the sensor is preferably at a nanosecond level.

In the worked examples of the present case, the performance of the reaction is associated with a colour change, and an optical sensor is provided to allow for the generation of a colour map across the array.

The analytical device may be provided with alternative sensors for measurement of other characteristics of the reaction mixture.

In one embodiment the analytical device may be provided with a range of sensors for detecting a plurality of characteristics of the reaction mixture.

The analytical device may comprise an optical sensor.

The data collected by the analytical device may be communicated to a control unit for analysis.

The analytical device may be controlled by the control unit. The control unit may coordinate the measurement of analytical information with the input.

The analytical device may be permitted to operate continuously to record analytical data from the reaction spaces.

Reaction Mixture

The matrix is provided with a reaction mixture, which is distributed across a plurality of reaction spaces.

The reaction mixture typically comprises one or more reagents, optionally together with a solvent and optionally together with a catalyst. The reaction mixture may be a liquid mixture, such as a solution.

The reaction of the reaction mixture is associated with a change in a detectable characteristic of the reaction mixture, such as an optical characteristic of the reaction mixture. The change in a characteristic of the reaction mixture is detectable by the sensor of the analytical device.

Typically the reaction mixture is for a non-equilibrium reaction, for example a reaction that is a non-equilibrium thermodynamic reaction.

The reaction mixture may be for a reaction that allows a large number of chemical states to be accessed, but all these states can be interconverted as a result of external operations.

The reaction mixture may be a reaction mixture for a chemical oscillator reaction, a polymerisation reaction, a molecular synthesis, or an autocatalytic processes The reaction mixture may be a reaction mixture for a chemical oscillator reaction. Such reactions are examples of non-equilibrium thermodynamic reactions.

When the reaction mixture is capable of periodic changes in the concentration of one or more species within the mixture, additional encoding can be achieved. Such an oscillator reaction may be initiated or altered by application of an input to the reaction mixture, applied by the input unit. In the present case, the oscillation is associated with a change in a characteristic of the reaction mixture that is detectable by a sensor of the analytical unit. The oscillation may be associated with a change in colour.

Where the reaction mixture is a chemical oscillator reaction, a localised reaction mixture within a reaction space may be regarded as an oscillation clock. The methods of the invention may therefore look at changes in the oscillation frequencies, which are influenced by the applied force, where such a force is applied to a reaction mixture in a reaction space.

In the absence of an applied input, a chemical oscillation localised in a reaction space may be essentially random, or chaotic, or not activated at all.

However, when a reaction space is addressed, local order within that reaction space may result. That local order may permeate, or propagate, from that reaction space into neighbouring reaction spaces. Analysis of the reaction spaces may show changes in the characteristics of the reaction that are associated with the propagation of the reaction from one reaction space into another. This may be referred to as a reaction wave which is established by the applied force from the input device.

Where a plurality of reaction spaces are addressed, each of these reaction spaces may set up a reaction wave that propagates beyond each addressed reaction space. A reaction mixture within a reaction space may receive a reaction wave from a neighbouring reaction space, and that reaction space may receive a plurality of reaction waves from a plurality of neighbouring reaction space, for example providing a constructive interference within the reaction space.

The chemical oscillator reaction may be selected from the group consisting of a Belousov-Zhabotinsky (BZ) reaction, a Briggs-Rauscher reaction and a Bray-Liebhafsky reaction, such as a Belousov-Zhabotinsky (BZ) reaction.

Other autocatalytic reactions can also be used, where the chemical change under consideration is reversible.

A BZ reaction may use bromine, for example as bromate.

In the present case, the reaction mixture may use an iron catalyst within the Belousov-Zhabotinsky (BZ) reaction mixture, such as iron catalyst oscillating between Fe(II) and Fe(III). The iron catalyst may be ferroin, $[Fe(bpy)_3]^{2/3+}$.

A chemical oscillation reaction may be a reaction which is chaotic in the absence of an applied force.

A chemical oscillation reaction may be a reaction where the oscillations are suppressed in the absence of an applied force.

A reaction in a reaction space may be initiated and optionally also sustained by the application of a force into the reaction space.

The worked examples in the present case demonstrate show the use of an applied mechanical force to a reaction mixture to initiate and sustain a BZ reaction.

The inventor has found that a reaction mixture within a reaction space that is addressed by the input device gives rise to a reaction wave that extends from the reaction space into neighbouring reaction spaces. Thus, the change in the reactivity within a certain reaction space is capable of altering the reactivity of the reaction mixture in another reaction space.

The reaction wave that is propagated from a reaction space typically has a limited extent by which it can alter reactivity in neighbouring reaction spaces. The conditions under which a force is applied to a reaction space may be selected to ensure that there is a limited extent of influence.

The present inventor has found that the propagation of a reaction into neighbouring reaction spaces may be used as the basis for the operation of the chemical computer as a logic gate, for example as an OR gate. Similarly the limited extent of the propagation may also be exploited for operation of the chemical computer as a logic gate, for example as an AND gate. Logic operations are described in further detail below.

The inventor has also found that some reactions, such as oscillating chemical reactions, retain a memory of their earlier perturbation, which refers to the earlier addressing of the reaction spaces by the input device. Thus, a reaction pattern may persist in the matrix for a period of time after an initial input into the matrix. In some embodiments, the memory may be permitted to degrade before further inputs are made into the system. In other embodiments, further inputs are made into the system whist there is a persistence of an earlier reaction within the matrix.

Control Unit

The chemical computer may further comprise a control unit, which may itself be a computer or a plurality of interlinked computers.

The control unit is suitably programmed to control the input device, for example the control unit is capable of controlling which reaction spaces within the matrix are addressed, and the duration, and optionally also the degree, of the forces applied in the address.

The control unit is suitably programmed to control the analytical unit, for example the control unit is capable of instructing the analytical unit which reaction spaces are to be analysed, and for how long. The control unit may also receive analytical data from the analytical unit, and it may analyse the analytical data.

A control unit may be used to control a plurality of matrices together with associated input units and analytical units.

The control until may be the interface through which a user is capable of operating the chemical computer.

Logic Gate

The chemical computer of the invention may be a logic gate. The logic gate may be selected from the group consisting of AND, OR, XOR, NOT, NAND, NOR and XNOR logic gates. A chemical computer of the invention may be capable of providing a plurality of logic functions, such as two or more of those logic functions mentioned previously.

In preferred embodiments, the logic gate is selected from an AND, OR and XOR logic gate. The worked examples in the present case exemplify the use of a chemical computer as a logic gate having AND, OR and XOR functionality.

A logic gate may comprise a chemical computer comprising a matrix, an input device and an analytical device, optionally also together with a control unit.

The matrix is adapted to function as a logic gate. Typically the input device is available to provide inputs to selected reaction spaces in the matrix, such as one or a plurality of reactions spaces. The distribution of the inputs across the matrix, thereby to specifically address certain reaction spaces, provides a distribution of reactivity across the matrix, and that reactivity may be measured by the sensor of the analytical device. The distribution of inputs to certain reaction spaces and the measurement of reaction outcome in other reaction spaces provides are steps that define the logic operation of the chemical computer.

The methods for operating a logic gate may include the step of addressing first and second reaction spaces in a matrix, where the first and second reaction spaces are non-neighbouring reaction spaces, and analysing a reaction mixture in a third reaction space, for example where the third reaction space is provided between the non-neighbouring first and second reaction spaces.

In one embodiment, the third reaction space is provided between and neighbouring each of the first and second reaction spaces. This arrangement is suitable for use as an OR gate. Thus, the first to third reaction spaces are contiguous. Addressing reaction spaces in this arrangement may be a part of a process of an OR operation in a logic gate.

Typically, where one of the first or the second reaction spaces is addressed, a reaction wave is propagated from the reaction space, which wave extends into the neighbouring third reaction space. The propagation of the reaction wave into that space gives rise to a reaction outcome that is detectable. Thus, an input into first or second reaction spaces give rises to a detectable signal.

Where both the first and second reaction spaces are addressed, this similarly gives rise to a detectable signal, in the third reaction space, by propagation of reaction waves from both the first and second reaction spaces into the third reaction space.

In one embodiment, the third reaction space is provided between each of the first and second reaction spaces, wherein the third reaction space does not neighbour either of the first and second reaction spaces. This arrangement is suitable for use as an AND gate. Typically the third reaction space is separated from the first reaction space by one or more further reaction spaces, and similarly, the third reaction space is separated from the second reaction space by one or more further reaction spaces. The reaction spaces, including the further reaction spaces may be provided inline.

Typically, where one of the first or the second reaction spaces is addressed, a reaction wave is propagated from the reaction space, however the reaction wave cannot significantly extend into third reaction space, and therefore there is no change or no significant change in the characteristics of the reaction mixture within the third reaction space.

Where both the first and second reaction spaces are addressed, a plurality of reaction waves are propagated. Here, the combination of two reaction waves into the third reaction space does give rise to a significant change significant in the characteristics of the reaction mixture within the third reaction space.

The operation of the AND gate exploits the limited extent of the reaction wave to extend far across the matrix. Thus a single reaction wave at the limit of its extent, cannot significantly alter a reaction in a reaction space, such as the third reaction space. Only when multiple reaction waves propagate into a reaction space is there a significant alteration in the reactivity, and this gives rise to a detectable signal.

The AND and OR gates may be operated in a system where the gates are operated by inputs that may be on or off, corresponding to I and 0 operations.

The operation of the XOR gate exploits differences in the reaction patterns generated in the matrix when different magnitudes of force are applied to specific reaction spaces. It has been found that logic operations can be read from the observed reaction wave pattern across the matrix.

As before, an XOR logic gate may comprise a matrix having first and second reaction spaces, which are typically non-neighbouring reaction spaces.

In the XOR logic gate operation, the first and second reaction spaces may be addressed at different magnitudes of force (this is the I and 0 input). This operation gives rise a reaction wave pattern across the matrix, which pattern is observed. In a symmetrical matrix with symmetrical arrangement of the first and second reaction spaces, the wave pattern that is generated by addressing the first or the second reaction space at different magnitudes of force is symmetrical. Typically the inventor has found that a bipolar wave pattern is generated.

The first and second reaction spaces may be addressed at the same magnitude of force, which may be at higher force or lower force (thus, the inputs are 0 and 0, or I and I). These operations also gives rise to reaction wave patterns across the matrix, which patterns are observed. In a symmetrical matrix with symmetrical arrangement of the first and second reaction spaces, the wave pattern that is generated by addressing the first or the second reaction space at the same magnitudes of force is not symmetrical. Typically the inventor has found that different non-bipolar wave patterns are generated, where the same magnitude of force is provided, at higher and lower force levels.

Thus, the XOR logic gate operation is based on the finding that the reactivity across the matrix differs in situations where the inputs are the same and are different.

A plurality of logic gates may be connected, such as in series or in parallel, to allow for more advanced logic operations. The combinations of logic gates in this way is well known to the skilled person.

Data Storage

The chemical computer of the invention may be used to encode information through the use of a chemical reaction to provide a unique reactivity distribution across a matrix.

The matrix of the chemical computer has independently addressable reaction spaces, each of which holds a part of the reaction mixture. Data may be chemically encoded into the matrix by appropriate manipulation of the inputs. The chemical reactivity that results from the inputs addressing reaction mixtures within the matrix gives rise to a reactivity profile across the matrix, which profile may be recorded by the sensor of the analytical unit.

In a simple operation, the input device is cable of binary operation for addressing each reaction space within the matrix. Thus, the input device can apply a force to a reaction space or not apply that force. In the worked examples of the present case, a mechanical force is applied to a reaction mixture by stirring of the mixture, and input device operates either to stir or not stir a reaction mixture.

The application of a force to reaction mixture in a reaction space changes the reaction mixture, for example where oscillation reactions are used, the input changes the oscillation of that reaction mixture.

Across the matrix the input device may operate to address selected reaction spaces, thereby to change the oscillations of the reaction mixtures in those reaction spaces. The changes in the reactions, such as the changes in the oscillations, may propagate from those reaction spaces into neighbouring reactions spaces, thereby affecting the reactions in those neighbouring reaction spaces also. Across the entire matrix this provides a particular reaction distribution the result of which is detectable by the sensor of the reaction For example, where a reaction is associated with a colour change, the reaction distribution across the matrix may give rise to a colour distribution, which colour distribution may be recorded by an optical sensor of the analytical unit. Such a system is exemplified in the present case.

The operation of the analytical device may be more complex than this, as the application of the force may be graded, that is there is a spectrum of forces that may be applied to each reaction space, and the analytical device may also be time controlled. Where the input device is capable of degrees of operation in relation to the forces it can apply, it follows that a range of different reaction results may be accessed within a reaction space, and these different reaction results in turn affect the propagation of the reaction wave from the reaction space into neighbouring reaction spaces. Thus different patterns of reactivity are accessible across the matrix.

The inputs into the chemical space of the matrix may be seen as a force pattern, which is a distribution of the applied forces to respective reaction spaces. This then given rise to a reactivity pattern across the matrix, which is the change in the reactions across the space, resulting from localised changes within addressed reaction spaces, which give rise to reaction waves that extend into neighbouring reaction spaces. The application of forces into the matrix generates a synchronized wave pattern.

Methods and Uses

The present invention provides the use of a chemical computer as a logic gate, and the use of the chemical computer as a data storage device. The operation of the chemical computer is as described above.

The chemical computer has programmability resulting from the discrete use of individual inputs to reaction spaces within the matrix. These inputs give rise to reaction waves within the matrix that combine to generate a unique reaction results that is the reactive response to those inputs.

The inventor has found that the reaction result in the matrix is repeatable for the same series of inputs. Thus the system is reliable and reproducible. The system can therefore recognise a particular output that is linked to a particular input.

Other Options

Each and every compatible combination of the embodiments described above is explicitly disclosed herein, as if each and every combination was individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described. Where technically appropriate embodiments may be combined and thus the disclosure extends to all permutations and combinations of the embodiments provided herein.

Certain aspects and embodiments of the invention will now be illustrated by way of example and with reference to the figures described above.

EXAMPLES

The following examples are provided solely to illustrate the present invention and are not intended to limit the scope of the invention, as described herein.

Discussion

The exemplification of the chemical computer uses a reaction mixture for a chemical oscillating reaction, and specifically a Belousov-Zhabotinsky (BZ) reaction. The computer architecture is based on data storage information processing via electron transfer between molecules of $[Fe(Bpy)_3]^{2/3+}$, and this depends on interactions between where the oxidized regions containing Fe(III) are blue, and the reduced states containing Fe(II) species are red. To achieve this, a platform was designed that controls the oscillations of the BZ reaction at local reactions spaces, or sites, in a matrix by externally manipulating the rotation speed of magnetic stirrers in the cells, and using a camera above the matrix to monitor the oscillation states of the reaction in the cells.

Figure 1:
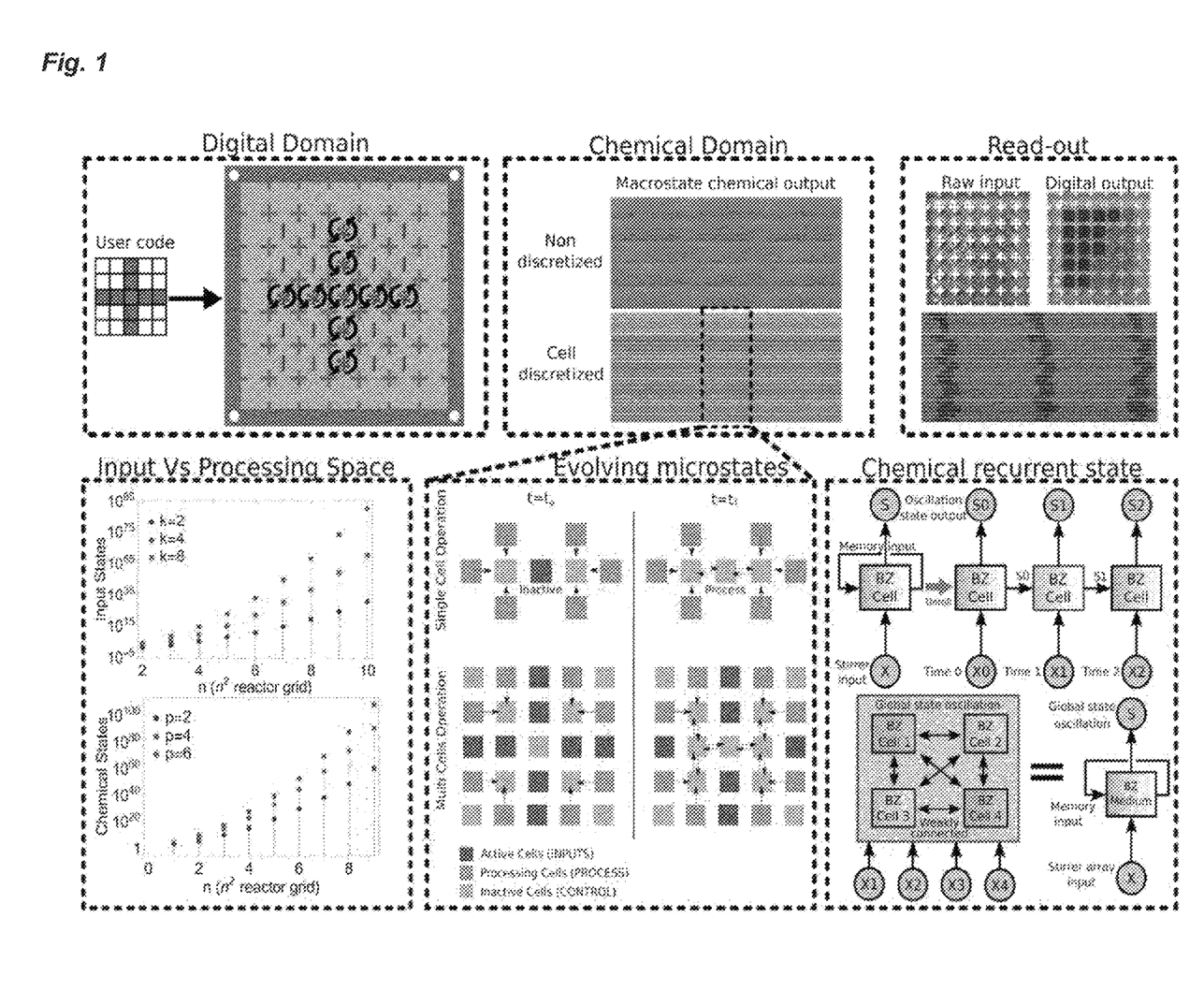

The exemplified chemical computer consists of four components (see FIG. 1).

(1) A matrix have 5×5 arrangement of reaction spaces, which may be regarded as reactor cell grid for the BZ reaction mixture, can be customized to the desired geometry depending on the experiment. In addition, by changing the size of the opening gap between neighbouring reaction spaces it is possible to control the global propagation of BZ excitation (see FIG. 2). When the gap size was large enough, the whole BZ medium generated coherent excitation wave patterns.

(2) A magnetic stirrer array consisting of 25 motors to control the stirrer bars placed within the individual BZ reaction spaces.

(3) An electronic control interface connected to a digital computer and the magnetic stirrer array. The rotation speed of each stirrer was individually controllable therefore, the local oscillations of the BZ reaction at a given cell could be individually addressed.

(4) The BZ reaction in the reactions spaces was monitored by a camera mounted above the grid. The camera was connected to a computer which analysed the BZ reaction in real time, and classified each cell as excited (blue) or non-excited state (red).

Ferroin, $[Fe(Bpy)_3]^{2/3+}$ was chosen as the sole catalyst since this gives simple oscillations and the colour change between the reduced form (red) and the oxidized form (blue) is distinct and easily tracked optically. The other chemical components used were hydrochloric acid, malonic acid and potassium bromate.

It is known that bulk oscillations of the BZ reaction break down and may become chaotic with short-lived or completely suppressed oscillations when they are not stirred (see Hsu et al.). This was exploited in the present system.

The excitation of an individual BZ reaction space in the matrix was controlled by activating a stirrer placed in that reactions space. To stir reactions mixture within a cell, and to drive patterns in the resulting oscillations, the platform described in FIG. 1 was used, where each reaction space contained a stirring bar, and the reaction spaces was located directly placed above a motor with a pair of opposing magnets attached to its shaft. This way, the stirring could be turned on and BZ oscillatory excitation waves generated only in specific reaction spaces.

Defining which reaction spaces were addressed by stirring and which were not (i.e. input pattern) could then impact the formation of excitation wave patterns on the chemical system. This is because the stirred reaction mixtures are more likely to generate oscillatory excited waves, which propagated to neighbouring cells and eventually formed a globally synchronized wave pattern. The speed of stirrers in the matrix could be individually controlled and input patterns with different stirrer speeds could result in different global wave patterns for the BZ reaction.

By using matrices of discrete but fluid-connected reaction spaces, it was possible to control the propagation of wave patterns from a cell to a neighbouring cell. The basic starting design for the platform comprised a 7×7 grid, where only the middle 5×5 cells were used.

Figure 2:
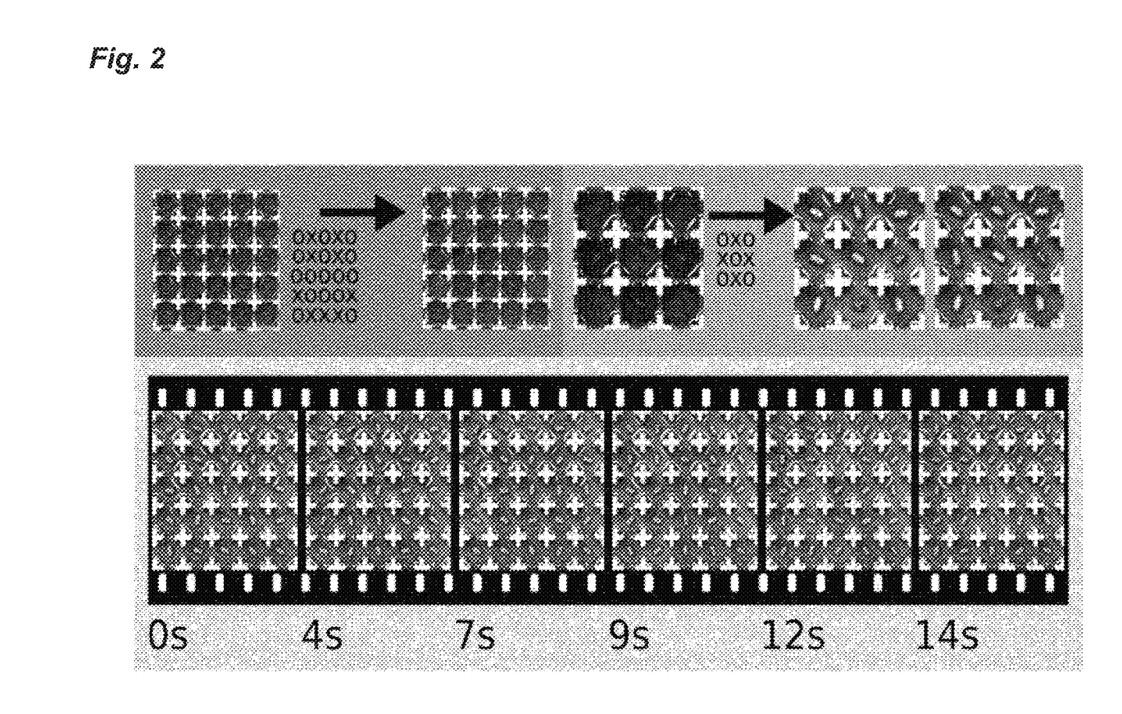
FIG. 2 shows (top left) a comparison matrix having limited connectivity between reaction spaces holding a reaction mixture for an oscillation reaction, and where specified reactions spaces are addressed (marked with "x") the observed changes in reactivity are substantially retained in each of the addressed reaction spaces; (top right) a matrix having reactive connectivity between reaction spaces holding a reaction mixture for an oscillation reaction, a and where specified reactions spaces are addressed (marked with "x") the observed changes in reactivity are seen to propagate into neighbouring reaction spaces; (bottom) changes in the observed reactivity over time from the initial addressing of the reaction spaces (from first input at 0 s to 14 s), where the generation of coherent patterns was observed. A reaction mixture in a reaction spaces is addressed by mechanical perturbation of the reaction space using a stirrer bar (when the stirrer bar is not enabled the matrix is marked with "o"). Changes in the oscillation reaction at a local were observable as changes in the colour of the reaction mixture, which was detectable by a camera operating as an optical sensor.

To control the interaction between cells, we first designed a prototype array of BZ cell grid using 3D printing which had a "v" shape opening between cells (FIG. 2B left). The BZ reaction volume used was 70 mL, which filled the arena to three quarters of its height, well above the "v" opening. With this design, it was found that oscillations did not propagate to neighbouring reaction spaces and the platform acted similarly to a display screen, where only the reactions spaces that were addressed flashed in blue, while the other ones remained red (FIG. 2 Top-Left)

To facilitate improved interaction between reaction spaces, we completely removed the "v" shaped part of the opening, leaving only the corners of each cell to define it (FIG. 2 Top-Right). This way the fluid from an addressed reaction space would propagate to its neighbours when stirred, and we could, for example, activate a reaction spaces that was disabled by stirring (and therefore activating) its neighbours.

The first objective was to emulate the behaviours of the simplest binary logic gates since they form the basis of modern digital computers. To build linearly separable binary logic gates, such as the "AND" and "OR" gates, we focused on the fact that BZ excitation waves generated at an activated reaction space easily propagate to direct neighbours (i.e. distance=1), but very rarely propagate to cells further away (i.e. distance>1). By exploiting this feature, we designed 2-bit logic gates using the distance between inputs to implement "AND" and "OR" gates (FIGS. 3, A and B). When the distance between the two inputs (denoted as X and Y, respectively) is set to 3 and the output is set as the middle column between them, our platform behaves like an "AND" gate, because oscillations in the output column are only observed when both inputs are activated. On the other hand, when the distance between the inputs is set to 2 and column 2 is defined as output, then the system behaves like an "OR" gate, because whenever any of the inputs is enabled, the oscillations propagate to the output column.

To implement a non-linearly separable logic gate, such as "XOR", we exploited the fact that when all of the stirrers were activated, globally synchronized wave patterns emerged from the system. We speculate that the emergence of globally synchronized patterns comes from two properties of the BZ reaction: (1) Sustained oscillation: once activated, a BZ reaction tends to sustain its oscillation even after the stirrer is off. Thus, each cell can be considered as an oscillator. (2) Signal convolution: the BZ excitation waves generated at a cell propagate to neighbouring cells where another excitation waves are generated. The waves collide and interact to form a synchronized oscillation. Thus, the whole BZ grid system can be viewed as a coupled oscillator system, or more in general, as a chemical dynamical system that consistently converts stirrer input patterns into patterns of excitation waves.

FIG. 3C shows how the XOR was implemented by exploiting the BZ oscillations synchronization between cells. In this case, the ON/OFF binary state of inputs employs two different stirrer speeds (ON for the full speed and OFF for the slowest rotation speed possible), instead of fully activating or disabling stirrers as we did before. In the BZ grid, the leftmost and rightmost five reaction space were considered as inputs, X and Y, respectively. If a column of five adjacent stirrers are rotated faster (the ON state), the stirrer motion generated a unidirectionally propagating wave pattern. This wave pattern was found to be symmetric, thus both (0, 1) and (1, 0) inputs give mirrored wave patterns. In contrast, the (0, 0) and (1, 1) inputs resulted in different yet reproducible wave patterns. To quantify these different wave patterns, we calculated the phase differences between the central cell and the other cells by cross correlation analysis (see FIG. 3C). In particular, (0, 1) and (1, 0) patterns show a bipolar pattern where one side ("0" or non-activated side) shows positively shifted phase (indicated in red) while the other side ("1" or activated side) shows negatively shifted phase because it was observed that excitation waves tend to propagate towards the cells with activated stirrers, thus phase is delayed. On the other hand, the other cases, (0, 0) and (1, 1), showed different non-bipolar patterns. Therefore, the XOR gate can be implemented by defining the bipolar wave pattern as output "1" and the other pattern as "0".

To expand the computability of our system to perform more complex tasks such as pattern recognition and data encoding, we interfaced our chemical computer to an Artificial Neural Network, which was used as computing output layer to discover and discern the BZ computational space. The wave propagation patterns described before were found to be reproducible between parallel experiments, which indicates that our BZ platform can consistently convert an input pattern into a wave propagation pattern. Detection and interpretation of such propagating patterns was relatively easy with simple input patterns, but it increasingly becomes more complicated to human interpreters as the input patterns become complex. However, the complex patterns generated were neither random, nor impossible to distinguish between them, because the BZ system generates consistent outputs in response to the same input pattern.

Figure 4:
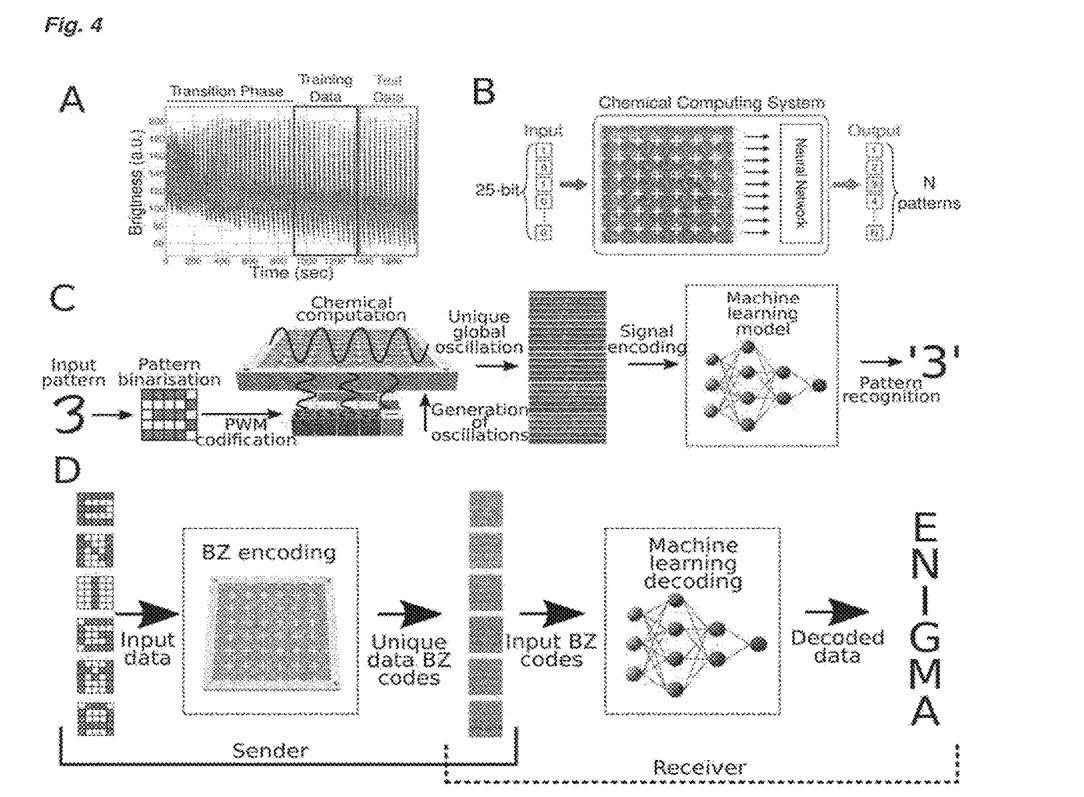
FIG. 4 is a series of schematics illustrating pattern classification and data encoding using a chemical computer system, where (A) is a schematic for BZ matrix data analysis using reservoir computing scheme; (B) is an example output pattern of the BZ reaction system. The data after the transition phase (~15 min) was used for pattern recognition, which was further split into two parts as training and test date, respectively; (C) is a schematic showing the full working pipeline of an embodiment of the invention. Initially the user selects a pattern to flash, and this pattern is binarised in 5 by 5 matrix. This matrix is used as a source for the PWM generator, and this will eventually generate a global oscillation. These oscillations are then encoded into a machine learning model, and decode when needed for pattern recognition; and (D) shows a BZ matrix and machine learning used for encoding data as an application example.

To exploit this feature, we adapted the 'reservoir computing' scheme using the BZ platform (FIG. 4, A) (Schrauwen et al.). Namely, the system's output is interfaced with a neural network which is used to classify different input patterns based on the wave they generate. The generated wave propagation patterns were input into a neural network layer after being processed using image processing in order to identify the BZ oscillations (FIG. 4, B). To capture the temporal dynamics of the wave propagation patterns, a sliding window over 100 time points (~50 seconds) was used to create a dataset with 2500 features (25 cells×100 time points). We first used ten different input patterns representing digital numbers from zero to nine with 1500 training data points and 300 test data points, which gave correct answers with 98.6% accuracy against the test dataset.

This result suggests that the BZ system produces consistent patterns upon a specific input pattern that can be distinguished by a machine learning algorithm (which may be too complicated for human eye). In other words, the BZ system satisfies the "echo state property" of reservoir computing (Yildiz et al.); i.e. each reaction space within its "reservoir" neighbours produces a nonlinear response signal which is combined into a desired output signal by means of linear combinations of these response signals in the BZ matrix. It also should be noted that the system is capable of distinguishing similar patterns. For example, the pattern of number "2" and "3" are similar (one bit difference), but the chemical computing system could easily distinguish them. We suspect that this happens because the BZ reaction converts the input patterns into a higher dimensional output space where the output neural network layer is able to find a hyperplane that can distinguish different inputs. In contrast, when using the reservoir system without the BZ reaction, but replaced with pure water, the output neural network is not capable of classifying the patterns because the dynamics of the water are not sufficient to project input patterns into higher dimensional space.

Figure 5:
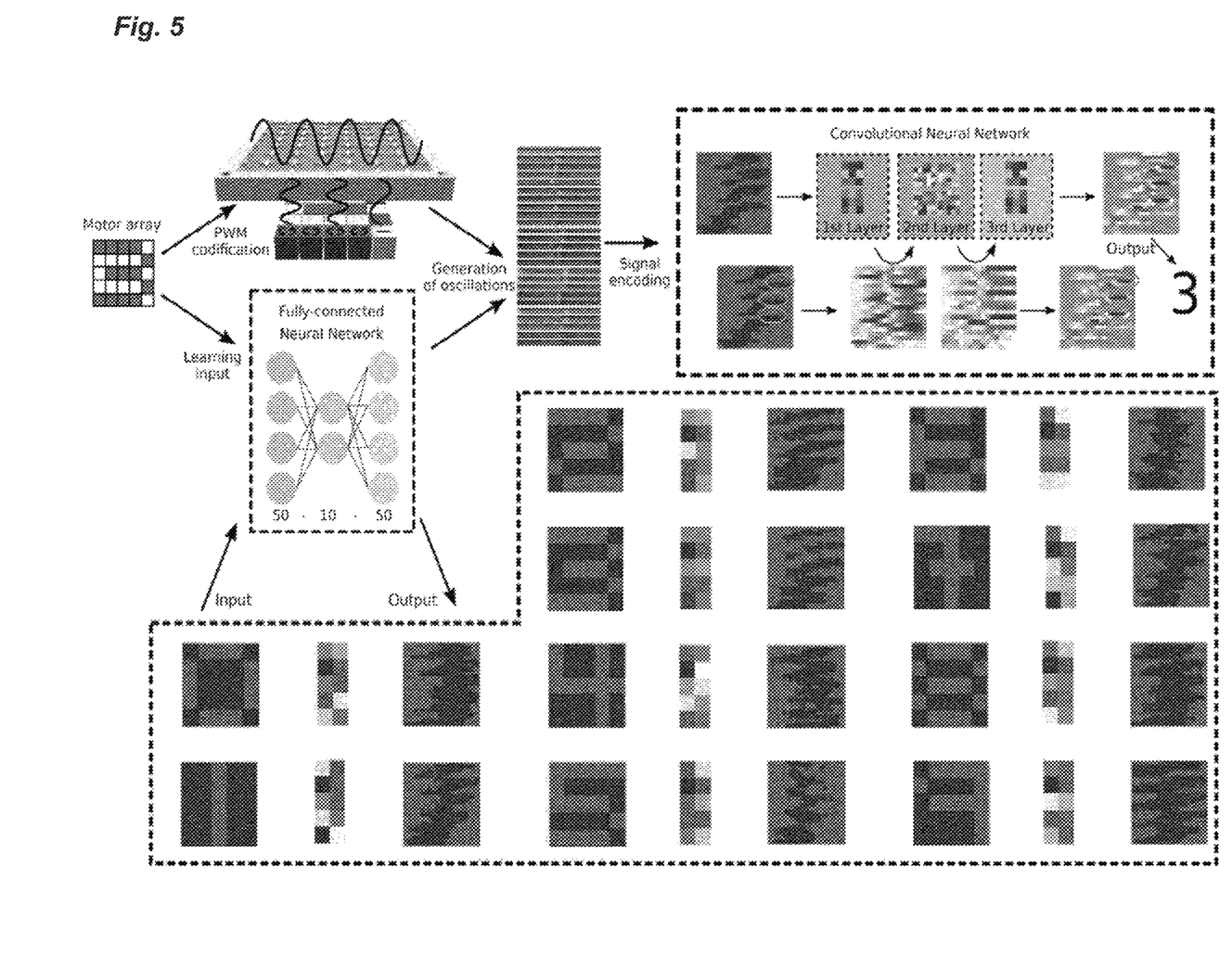

To prove that during the pattern recognition process our BZ platform acted like a chemical computer, we performed a similar experiment, but in this case the BZ platform was replaced by a Fully-connected Neural Network (in particular, an Autoencoder) which had been trained to digitally produce BZ oscillations from input motor patterns, see FIG.

5 Top-left. This way, the Autoencoder had as inputs the different motor patterns, it then digitally generated a BZ oscillation, and then this BZ oscillation was classified using a Convolutional Neural Network (CNN) (FIG. 5 Top-Right). This is effectively the same process detailed in FIG. 4D, but by-passing the BZ medium and using a neural network instead. The CNN correctly labelled the different BZ oscillations, both the ones generated through the BZ medium, and the ones generated with the Autoencoder. This unequivocally means that our platform is acting like a chemical computer because it is developing the same role as a neural network, specifically we can consider this to be acting like a chemical autoencoder.

To bench mark the effective computational power of exhibited by the 25-cell BZ system, we should consider the number of logical operations that the equivalent neural network would need to do in order to decode the patterns, and how this is manifested in the silicon substrate. Given the BZ platform has $2^{25}$ binary stirring pattern sates and around $3.77 \times 10^{22}$ chemical states, this seemed a reasonable challenge. Eventually it was possible to use an autoencoder that had three layers of 50-10-50 neurons, with 25 inputs for layer 1, 50 inputs for layer 2, and 10 inputs for layer 3 would give outcomes with similar accuracy. The total number of operations can be evaluated to be of the order of 60 M operations using around 32 M logic gates, which would need 100 M transistors. The total time the chemical-computer needed to decode the pattern is around 60 seconds worth of data which equates to around 1 M s$^{-1}$.

This is believed to be the first time a chemical computer has been benchmarked, and it is shown that the complexity of the present system can be used to access a much larger computational space than then input space would allow.

The chemical computer of the invention serves as a sophisticated system in which the dynamics or functions that are theoretically difficult to infer can be calculated within the computation space defined by the localised reactivity within the chemical computer.

The chemical computer can be exploited as encoding device, and we have tested the described chemical encoding machine, and in our tests it could distinguish a total of 26 patterns reliably, with up to 96% accuracy (see SI). This was achieved by addressing the cells individually, generating oscillations at localized positions, yet are weakly connected in a shared medium, creating a network of coupled oscillators, similar to, for example, the oscillatory neural computer network.[21] In a 5×5 grid as defined, and in the case of binary stirrer inputs, there are a total of $2^{25}$ (33554432) different states, although if we remove the binary restriction of the input, our pulse-width-modulation generator can generate 3500 different signals, for a theoretical total of $3500^{25}$ different states in the BZ computation space.

Methods

Automated Platform

An automated platform was designed and built in order to perform the experiments. The CAD design was done using OpenSCAD, and the pieces were manufactured using the 3D-Printer "Stratasys Connex" and their material "VeroWhitePlus". Each reaction space in the matrix platform contained a stirrer bar (8×3 mm). Under each reaction space there was a geared DC motor (6 V 200 RPM). These DC motors were controlled with a PWM signal. This PWM signal was generated using Arduino Mega, and the shield from Adafruit "16-Channel 12-bit PWM/Servo shield—I2C interface". A computer connected to the Arduino board through USB ultimately defined the different PWM signals through a Python script.

Preparation of Solutions

Ferroin Indicator: 0.025 M solution was prepared by dissolving 0.70 g of ferrous sulfate heptahydrate and 1.5 g of 1,10-phenanthroline in 100 mL of water. Finally, 15 mL of this product were dissolved in 110 mL of water.

Potassium Bromate: 1M solution was prepared by dissolving 16.7 g $KBrO_3$ in 100 mL of 1 M $H_2SO_4$.

Sulfuric Acid: 1 M $H_2SO_4$ was prepared by taking 5.6 mL conc. $H_2SO_4$ (96%, 18 M) and adding to water to reach a total volume of 100 mL.

Malonic Acid: 1M solution was prepared by dissolving 10.4 g malonic acid in 100 mL 1M of $H_2SO_4$.

1M $H_2SO_4$ was sourced from Fisher Scientific, >95% analytical reagent grade. Malonic acid was sourced from Sigma Aldrich, Reagent Plus 99%. Ferrous sulfate heptahydrate was sourced from Sigma Aldrich, >=98%. 1,10-Phenanthroline was sourced from Sigma Aldrich, >=99%. Potassium bromate was sourced from different sources. The main body of work of this research used the one sourced from Lancaster, 99%. Other suppliers used: Scientific Laboratory Supplies, 99% Alfa Aesar, 99.8% Alfa Aesar and Millipore Ensure.

Image Processing of Recorded Reaction Data

The experiments were recorded using a web camera (LifeCam Cinema, Microsoft) and saved as AVI videos using XVID compression, 800 by 600 pixels and 30 FPS. OpenCV 3.4.1 and Python 3.6.5 were used. A dataset was built were a human labelled different cells as red or blue. In total, 1541 cells were labelled as red, and 888 as blue. An SVM was trained using this dataset. Each frame of a recorded video was processed by a pre-trained Support Vector Machine model to determine the activation/non-activation state of BZ cells (cf. FIG. 1E). The SVM library used was the one built into OpenCV. The activation state data categorized by SVM was exported into a CSV file, in which the activated state was defined as "1" and the non-activated state as "0".

Machine Learning for Chemical Reservoir Computing System

After the binary CSV file was generated, it was input into a machine learning output layer of the chemical reservoir computing system. For the output layer, a multi-layered perceptron (MLP) was used. We used a MLP with only one hidden layer. Typically, 2500 input nodes and 200 hidden layer nodes. The size of the final layer was changed depending on the number of patterns to be classified. For activation function, rectified linear unit (ReLU) and softmax functions were used for the hidden and final layers, respectively. RMSprop was used for gradient descent optimization algorithm with categorical cross-entropy as cost function.

Accuracy of predictions were measured by "accuracy_score" function from "scikit-learn" library, which was defined as:

$$\text{accuracy}(\hat{y}, y) = 1/N \Sigma_{i=0}^{N-1} 1(\hat{y}_i = y_i)$$

where $\hat{y}_i$ and $y_i$ are the predicted and true values of i-th sample, respectively. Computation was performed using a custom code written in Python (version 3.6 from Anaconda 4.3.0). Keras with TensorFlow backend was used to perform computation. A graphical processing unit, GTX1060 with 6 GB memory, was used to speed up the computation.

Convolutional Neural Network and Autoencoder

The Convolutional Neural Network (CNN) and Autoencoder implementations from Tensorflow was used. Patterns representing numbers from 0 to 9 were used. The CSVs used were the binarised ones. Therefore, each of these CSV had values 0 to 1. These CSV contained 3600 columns values which represented 30 minutes of experiment. In this case, rows from 1000 to 3600 were used. The window size used was 25. Therefore, the inputs to the CNN were 25 by 25, or 625 values. The test and train ratio were set to 30%. Three CNN layers were used. The first one uses 2 feature maps and a kernel size of 3. The second one uses 2 feature maps and a kernel size of 5. The third one uses 1 feature maps and a kernel size of 3. After this, there is a pooling layer, with 2 feature map and a kernel size of 2. Finally, there is a fully connected layer with 16 neurons, and then 10 output neurons. The Autoencoder used had 25 inputs and 625 outputs. Three hidden layers were used of 50, 10 and 50 neurons. The autoencoder was trained using two cycles of 3000 iterations each. The learning rate was 0.000001 and L2 regularization was used (0.00001). The input of this autoencoder were 5 by 5 motor patterns, and its output of 625 nodes was used as input to the CNN described.

Experimental Data

By using 3D printing to construct grids of discrete but fluidically-connected cells, we were able to control the propagation of wave patterns from a cell to a neighbouring cell. The designs were manufactured in a chemically resistant white plastic to allow the colour of each cell to be easily monitored. The basic starting design for the reactionware comprised a monolithic rectangular block into which a square arena was inset. This was then divided into equal sized cells by printing walls at equal spacings, with cut-outs in each wall to allow fluidic connection.

We first performed several pilot experiments to determine a suitable cell design that would produce sustained bulk BZ oscillation waves over the whole cell, while being sufficiently large to be imaged consistently. The best results were obtained using a 7×7 grid of 16×16 by 5 mm cells where the cut-out accounted for a third of each connecting wall. Of the 7×7 grid, only the middle 5×5 cells were used for experiments in order to avoid cells on the edges (with fewer neighbours) which might be expected to oscillate differently.

To control the interaction between cells, we first designed a prototype array of BZ cell grid which had a "v" shape opening between cells and the BZ reaction volume used was 70 ml, which filled the arena to three quarters of its height, well above the "v" opening. With this design, it was found that oscillations did not propagate to neighbouring cells and the platform acted similarly to a display screen, where only the cells that were enabled flashed in blue, while the other ones remained red. This demonstrated that our platform can act as a "display screen". In order to test it, we used a static activation pattern of cells to flash a "smiley emoji" pattern and also sequenced pattern where columns were activated one after the other, left to right.

To facilitate improved interaction between cells, we completely removed the "v" shaped part of the opening, leaving only the corners of each cell to define it as fluid dynamics simulations showed that the removal of the barriers allowed the fluid from a stirred cell propagate to neighbouring cells upon stirring. This way, as can be seen in the 4-way neighbourhood test, the fluid from an activated cell would propagate to its neighbours when stirred, and we could, for example, activate a cell that was disabled by stirring (and therefore activating) its neighbours.

REFERENCES

All documents mentioned in this specification are incorporated herein by reference in their entirety.

Adamatzky et al. On computing in fine-grained compartmentalised Belousov-Zhabotinsky medium. *Chaos, Solitons & Fractals*, 44, 779-790 (2011).

Crowley, M. F. & Epstein, I. R. Experimental and theoretical studies of a coupled chemical oscillator: Phase death, multistability, and in-phase and out-of-phase entrainment. *J. Phys. Chem.* 93, 2496-2502 (1989).

Deco, G. & Kringelbach, M. L. Hierarchy of Information Processing in the Brain: A Novel 'Intrinsic Ignition' Framework. *Neuron* 94, 961-968 (2017).

Hsu, T. J., Mou, C. Y. & Lee, D. J. Effects of Macromixing on the oregonator model of the belousov-zhabotinsky reaction in a stirred reactor. *Chem. Eng. Sci.* 49, 5291-5305 (1994).

Lebender et al. Logical Gates Using a Nonlinear Giemical Reaction. *J. Phys. Chem.* 98, 7533-7537 (1994).

Schinor et al. The phases of small networks of chemical reactors and neurons. *Biophys. Chem.*, 85, 199-208 (2000).

Schrauwen, B., Verstraeten, D. & Van Campenhout, J. An overview of reservoir computing: theory, applications and implementations. *Proc. 15th Eur. Symp. Artif. Neural Networks* 471-82 (2007). doi:1854/11063.

Szymanski et al. Droplets with information processing ability. *University of Jena*.

Toffoli, T. Nothing makes sense in computing except in the light of evolution. *Int. J. Unconv. Comput.* 1, 3-29 (2005).

Watts, D. J. & Strogatz, S. H. Collective dynamics of 'small-world' networks. *Nature* 393, 440-442 (1998).

Yildiz, I. B., Jaeger, H. & Kiebel, S. J. Re-visiting the echo state property. *Neural Networks* 35, 1-9 (2012).

Zhu, S. L. & Wang, Z. D. Unconventional geometric quantum computation. *Phys. Rev. Lett.* 91, (2003).

The invention claimed is:

1. A chemical computer comprising a matrix, an input device and an analytical device, wherein:
the matrix comprises a plurality of interconnected reaction spaces holding a reaction mixture, wherein the interconnected reaction spaces are connected via fluid passages;
the input device is provided to independently address each of a plurality of reaction spaces within the matrix; and
the analytical device has a sensor to analyse a reaction characteristic of a reaction mixture in one or more reaction spaces.

2. The chemical computer according to claim 1, wherein the reaction mixture is a reaction mixture for a chemical oscillator reaction.

3. The chemical computer according to claim 2, wherein the chemical oscillator reaction is selected from the group consisting of a Belousov Zhabotinsky (BZ) reaction, a Briggs Rauscher reaction and a Bray Liebhafsky reaction.

4. The chemical computer according to claim 3, wherein the reaction is a Belousov Zhabotinsky (BZ) reaction.

5. The chemical computer according to claim 1, wherein the reaction mixture is a reaction mixture having a colour change in its reaction, and the analytical device has an optical sensor to analyse the colour change in one or more reaction spaces.

6. The chemical computer according to claim 1, wherein the input device is for independently providing an input to each of a plurality of reaction spaces within the matrix, wherein the input is selected from the group consisting of a mechanical force, an optical input, an electrical input, a sonic input, a magnetic input and a thermal input.

7. The chemical computer according to claim 6, wherein the input device is for independently providing a mechanical force to each of a plurality of reaction spaces within the matrix.

8. A logic gate which comprises a chemical computer according to claim 1.

9. The logic gate according to claim 8, comprising a plurality of chemical computers according to claim 1, where the chemical computers are provided in series or in parallel.

10. A method of operating a chemical computer, the method comprising the steps of:
  (i) providing the chemical computer of claim 1;
  (ii) addressing a first and/or a second reaction space in the matrix using the input device;
  (iii) analysing a reaction characteristic of a third reaction space using the analytical device;
  (iv) determining a logic result based on the addressing step and the analysis step.

11. The method of claim 10, wherein the third reaction space is provided between and neighboring each of the first and second reaction spaces.

12. The method of claim 10, wherein the third reaction space is provided between each of the first and second reaction spaces, and wherein the third reaction space is separated from each of the first and second reaction space by one or more further reaction spaces.

* * * * *